United States Patent [19]

Bailey et al.

[11] Patent Number: 4,482,902

[45] Date of Patent: Nov. 13, 1984

[54] RESONANT GALVANOMETER SCANNER SYSTEM EMPLOYING PRECISION LINEAR PIXEL GENERATION

[75] Inventors: David C. Bailey, Cocoa Beach; Lee M. Burberry, West Melbourne; Donald E. Trimble, Melbourne; Andrew M. Bardos, Indian Harbor Beach; Philip M. Perry, Palm Bay, all of Fla.

[73] Assignee: Harris Corporation, Melbourne, Fla.

[21] Appl. No.: 413,148

[22] Filed: Aug. 30, 1982

[51] Int. Cl.³ .............................................. G01D 9/42
[52] U.S. Cl. ...................................... 346/108; 350/6.5
[58] Field of Search .................. 346/108; 350/6.5, 6.6, 350/6.8

[56] References Cited

U.S. PATENT DOCUMENTS

| | | | |
|---|---|---|---|
| 3,441,949 | 4/1969 | Rolon | 346/108 |
| 3,848,087 | 11/1974 | Carrell | 350/6.8 |
| 4,099,829 | 7/1978 | Straayer | 350/6.1 |
| 4,204,233 | 5/1980 | Swager | 358/293 |
| 4,270,131 | 5/1981 | Thompkins | 346/108 |
| 4,384,297 | 5/1983 | Ohara | 346/108 |
| 4,420,760 | 12/1983 | Phillips | 346/108 |

*Primary Examiner*—Joseph W. Hartary
*Assistant Examiner*—M. Reinhart

*Attorney, Agent, or Firm*—Antonelli, Terry & Wands

[57] ABSTRACT

A high resolution scanning system, employing non-linearly driven galvanometer deflection optics, compensates for both the non-linear rate of travel of the information pixel beam and for pixel position offset introduced by an optical subsystem (a flat field lens) that equalize pixel size and quality across the recording medium. The system employs a single high speed reference clock the output pulses of which are counted and used to address a compensation data-containing PROM (programmable read only memory). The contents of successive addresses of the PROM contain pixel location codes identifying the position on the recording medium where a pixel of interest is to be recorded. These codes are derived in accordance with the periodic non-linear rate of travel of the scanning optics across the recording medium and the measured parameters of a flat field lens disposed in the path of the scanning beam. For a sinusoidal scan, the successive PROM addresses contain pixel location defining codes that are effectively compensate for the non-linearity of the sinusoidal scan rate of the galvanometer deflection drive and the image position offset introduced by the flat field lens optical subsystem. Because of this complementary action, the spacing between pixels can be made constant along a recorded line of pixel data.

18 Claims, 3 Drawing Figures

# RESONANT GALVANOMETER SCANNER SYSTEM EMPLOYING PRECISION LINEAR PIXEL GENERATION

FIELD OF THE INVENTION

The present invention relates to a scanning arrangement for a printing system and is particularly directed to an arrangement for compensating for the non-linear travel of a pixel recording optical beam across a recording medium.

BACKGROUND OF THE INVENTION

Optical scanners for printing systems commonly employ some form of rotational drive mechanism for scanning a recording beam across an information storage device, such as a recording drum, planar medium, etc. Because the drive mechanism imparts rotational or oscillatory motion to the scanning optics, the rate of travel of the information beam across the recording medium is non-linear (typically sinusoidal), so that some form of image position correction must be introduced into the system. One approach has involved the use of a multifacetted rotating mirror or prism scanner having a constant speed drive in place of the sinusoidal scanner. Disadvantageously, the extremely high degree of precision to which each of the facets of the scanning optics must be ground and polished imparts an inordinate expense to such schemes; also wear of the moving parts of the constant speed drive creates a difficult alignment problem, making these systems practically unattractive.

Examples of such rotating polygon systems are described in the Swager U.S. Pat. No. 4,204,233 and Gilbreath U.S. Pat. No. 4,257,053. These patented systems propose to compensate for non-linearities by controlling the time of generation and modulation of the pixels based upon the non-linearities in the polygon facets. Such an approach is still akin to the costly and complex precision facet grinding and polishing techniques referenced-above, since highly refined analysis of the characteristics of each of the polygon's reflective surfaces is required.

Recognizing the complexity and cost shortcomings of the above proposals, there has been proposed a system described in the Broyles et al U.S. Pat. No. 4,037,231 which involves a simpler approach of addressing the non-linear (sinusoidal) movement of the scanning optics, and imparting a compensation into the modulations of the information beam. Unfortunately, this compensation involves only a segmented approximation of the non-linear travel of the sinusoidal scan and the non-linearities in the intensity of the pixel recording beam. As a result, the simplicity sought to be achieved by Broyles et al yields a system that suffers a loss in precision; also, it is not readily adaptable to a wide variety of scanning drive inputs. Moreover, in the system of Broyles et al the segmented approximation approach is implemented by incorporating separate control clocks for the different sinusoidal segments of interest, thereby involving additional circuit complexity. Of course, the accuracy of the Broyles et al approach is limited to within specified approximately linear regions or segments of the sinusoidal scan, thereby limiting the extent of coverage by the scanner.

SUMMARY OF THE INVENTION

In accordance with the present invention, there is provided a high resolution scanning system employing non-linearly driven galvanometer deflection optics which precisely, yet simply, compensates or corrects for both the non-linear rate of travel of the information pixel beam across the recording medium and for non-linearities in pixel size and quality. To this end the system according to the invention employs a single high speed reference clock the output pulses of which are counted and used to address a compensation data-containing PROM (programmable read only memory). Each time the contents of a clock pulse-counting counter matches the contents of the current address of the PROM, the information beam is modulated with pixel data and recorded on the recording medium. The contents of successive addresses of the PROM contain pixel location codes identifying the position on the recording medium where a pixel of interest is to be recorded. These codes are derived, in part, in accordance with the periodic non-linear rate of travel of the scanning optics across the recording medium. For a sinusoidal scan, the successive PROM addresses contain pixel location defining codes that are substantially complementary to the non-linearity of the sinusoidal scan rate of the galvanometer deflection drive.

An additional aspect of the invention system involves the use of a focus and field correcting optical subsystem which corrects for the fact that the galvanometer is carrying out a rotational scan over a field having a prescribed curvature that is imaged onto an essentially flat recording medium. The correction action of the optical subsystem causes each pixel to be of the same size and properly focussed on the recording medium. To achieve this function, the optical subsystem, which is preferrably comprised of a single flat field lens of the type described in U.S. Pat. No. 4,099,829, assigned to the assignee of the present application, necessarily introduces a certain amount of measurable pixel position offset into the recording beam as it is scanned across the recording medium. This lens-generated offset constitutes an additional nonlinearity from which a complementary function can be calculated and used to derive the respective pixel location codes stored in the PROM.

As a result of the overall complementary action of the codes stored in the PROM, image position offset that would otherwise occur because of the nonlinearities of the galvanometer scan and the focus and field correcting lens are precisely compensated, not merely approximately compensated as in the Broyles et al system, referenced-above. This means that the present invention offers improved resolution with fewer components and less cost than previous designs.

DETAILED DESCRIPTION

Figure 1:
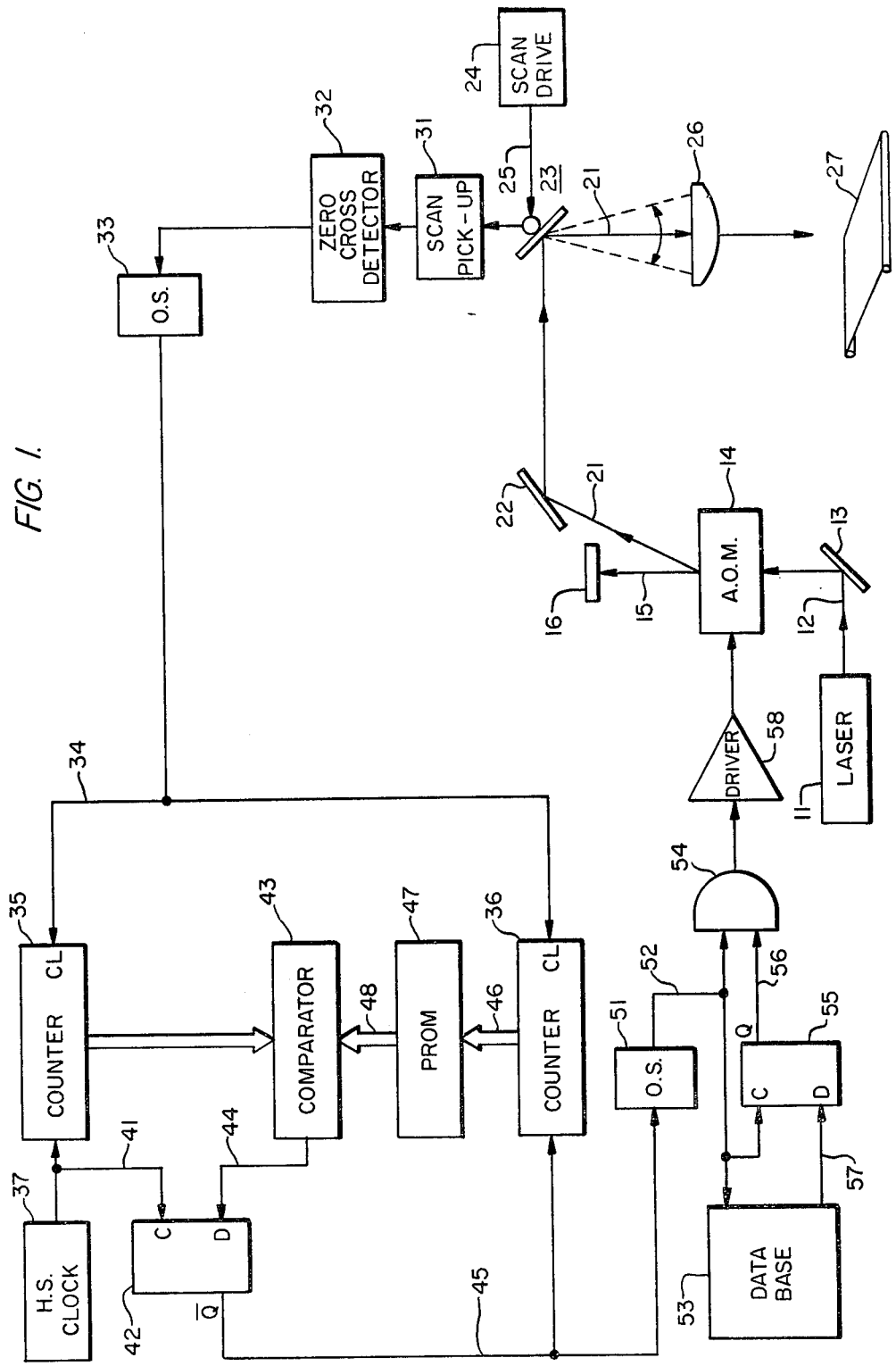
FIG. 1 is a schematic block diagram of a galvanometer scanning system according to the present invention.

Referring now to FIG. 1, a schematic block diagram of the printer employing the novel galvanometer scanning system according to the present invention is illustrated. It is to be noted, at the outset, that each of the individual components shown in FIG. 1 embodies commercially available electronic circuitry and control mechanisms; as a result, details of the components, per se, will not be described, as they are readily understandable by one of ordinary skill in the art. Instead, the manner in which the individual components cooperate with one another to achieve the precise linear pixel recording scheme using a non-linear galvanometer scan according to the present invention will be explained, with reference, where appropriate, to attendant timing diagrams shown in FIGS. 2 and 3.

The printer according to the present invention employs an optical imaging subsystem and a pixel modulation timing control subsystem which controls the timing at which the individual pixels are to be generated as the galvanometer scanning optics traverses the recording medium. Within the optical subsystem, a suitable light source, such a laser 11 provides an output beam 12 which is reflected off of a mirror 13 to be intensity modulated by an acousto-optic modulator 14 provided in the path of beam 12. The nondiffracted or zero order output beam of modulator 14 is intercepted by a suitable DC stop element 16, whereas the first order diffracted information beam 21 is deflected by mirror 22 towards a scanning galvanometer mirror 23. Mirror 23 is driven in a non-linear manner (e.g. at a sinsoidally varying rate of travel) to cause the output beam 21 of modulator 14 to sweep back and forth at a non-linear rate across an essentially flat or planar imaging segment of a suitable photosensitive recording medium 27. Interposed in the path of the beam 21 between the scanning mirror 23 and the recording medium 27 is a focus and field correcting optical subsystem 26, which provides for a uniform exposure for the pixel spots that are recorded on the recording medium 27 as the beam 21 is swept across the recording medium irrespective of the angle at which beam 21 is deflected by scanning mirror 23 toward recording medium 27.

Such an optical subsystem is necessary to compensate for the fact that the galvanometer scanner is carrying out a rotational scan over a field having a prescribed curvature that is imaged onto an essentially flat or planar imaging area of recording medium 27. Preferrably optical subsystem 26 is comprised of a flat field lens of the type described in U.S. Pat. No. 4,099,829, assigned to the assignee of the present application, that offers a considerable savings in cost and component complexity over conventional multi lens subsystems.

As optical subsystem 26 causes each pixel that is recorded on recording medium 27 to be of the same size and intensity, it necessarily introduces an offset error at the respective positions on the recording medium where the pixels are recorded. This offset error is measurable and, as will be explained below, is used to derive pixel position correction codes that are stored in a programmable read only memory for controlling the timing of the generation of the pixels during the galvanometer scan of recording medium 27. Recording medium 27 is displaced by a suitable drive mechanism (not shown) so that successive lines of pixels may be recorded as the galvanometer deflection mirror 23 is driven back and forth.

In the exemplary embodiment described herein, the driving mechanism for galvanometer scan mirror 23 is a sinusoidal input from a suitable oscillatory scan drive unit 24. Such a galvanometer scan mechanism may be a resonant mechanical oscillator of the tortion bar type having an electromagnetic drive and pick up with a stable natural resonant frequency as described in the above-mentioned Broyles U.S. Pat. No. 4,037,231, or it may be any other type of galvanometer deflection system whose input is controlled by whatever periodic scanning signal is selected. For purposes of the present invention, the only required component for operation of the modulation electronics is an a priori knowledge of the scan signal to be applied to the galvanometer sweep and the characteristics of the optical subsystem (flat field lens) 26, which are readily measurable. It is from this scan signal and the measured parameters of flat field lens 26 that a compensation/linearizing table is derived and stored in a programmable read only memory, so that the pixels that are recorded on recording medium 27, as mirror 23 scans beam 21 thereacross, are equally spaced and of equal intensity and size.

A suitable scan pickup device 31 is coupled to the galvanometer scanning mirror mechanism 23 and generates an output representative of the movement of the mirror as it oscillates, scanning the beam 21 across the recording medium 27. To locate a prescribed position of the mirror relative to recording the medium, a zero crossing detector 32 may be coupled to the output of scan pickup 31 so as to detect a prescribed portion (specifically the zero crossing locations) of the signal produced by scan pickup 31. The output of zero crossing detector 31 is then applied to a monostable multivibrator, or one-shot, 33 to produce a pulse having a prescribed delay time, or width, which governs the location of the start of the modulation of the pixels as beam 21 begins its scan at one side of the recording medium 27 and traverses thereacross. This will be described in more detail in conjunction with FIG. 2, to be described below.

The output of one-shot 33 is coupled over line 34 to a pair of counters 35 and 36. Counter 35 may comprise a suitable multistage binary counter that counts high speed pulses produced by high speed clock 37. The falling edge of the pulse produced by one-shot 33 on line 34 clears or resets counter 35 to begin counting anew the pulses produced by clock 37. Counter 36, on the other hand, counts output pulses produced on line 45 from the Q output of flip-flop 42. The clock input of flip-flop 42 is coupled to line 41 from high speed clock 37. The D input of flip-flop 42 is coupled over line 44 to the output of a digital comparator 43. Comparator 43 has two sets of digital inputs, one of which is coupled to the stages of counter 35 and the other which is coupled to stages of a programmable read only memory (PROM) 47. Memory 47 is successively addressed by the contents of counter 36 over address lines 46.

As mentioned previously, memory 47 contains pixel location codes stored in successive memory addresses, which codes are derived to complement the non-linear scanning rate of the sinusoidal scanning signal applied to the galvanometer deflection mirror 23 and also taking into account the focus and field correcting parameters of the flat field lens that is inserted in the beam scan path. Each time that binary counter 36 is incremented by a clock signal on line 45 from flip-flop 42, a new code will be produced on output link 48 from memory 47. When the contents of counter 35 reach a value corresponding to that code, the output of comparator 43 on line 44 changes state, so as to produce a signal on line 45. The signal on line 45, in addition to incrementing counter 36, is applied to a monostable multivibrator or one-shot 51. One-shot 51 produces a narrow duration pixel clock pulse which is applied to a data base 53, to the clock input of a flip-flop 55 and to one input of an AND gate 54. Data base 53 contains digitally encoded image information to be recorded on recording medium 27 by the user of the system. When accessed by the signal on line 52, data for the next pixel to be recorded ("1" or "0") is coupled over line 57 from the data base to the D input of flip-flop 55. The Q output of flip-flop 55 is coupled over line 56 to gate 54 so that the user's data is coupled through gate 54 for the duration of the narrow pixel pulse on line 52 and applied to RF driver circuit 58. The output of RF driver 58 is coupled to acousto-optic modulator 14 to modulate the intensity of beam 12 from laser 11 according to the binary value of the pixel to be recorded at that instant.

Figure 2:
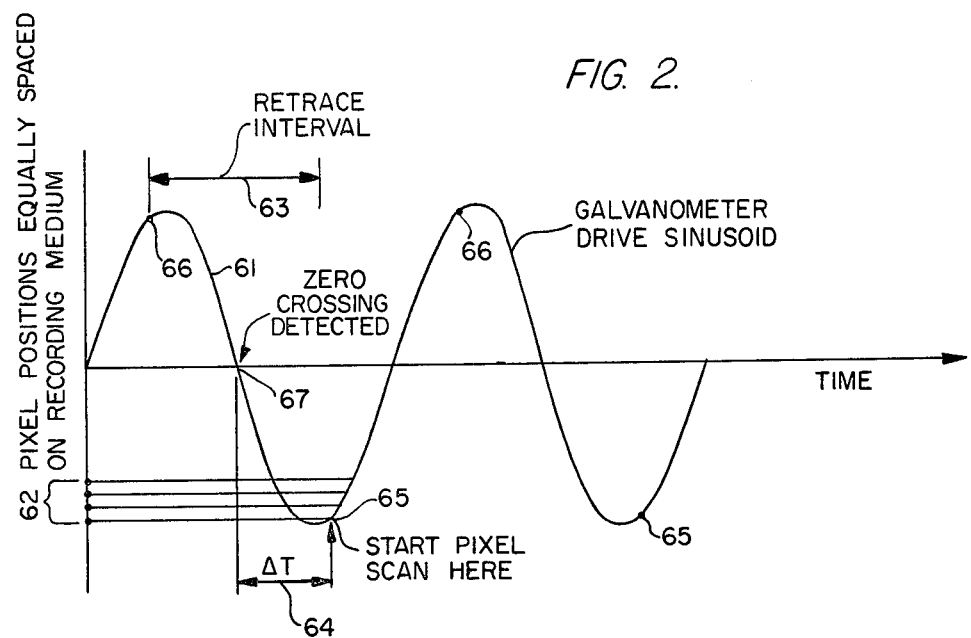
FIG. 2 is a timing diagram showing an exemplary non-linear sinusoidal galvanometer deflection scan.
Figure 3:
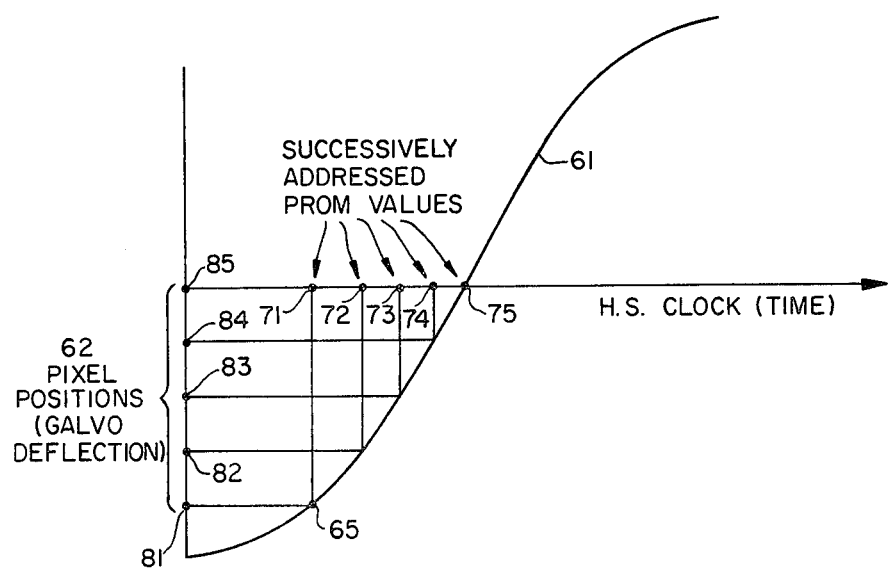
FIG. 3 illustrates a portion of the sinusoidal trace of FIG. 2 with selected pixel positions and corresponding PROM location codes being particularly identified.

In order to facilitate an understanding of the operation of the system shown in FIG. 1, attention is directed to FIGS. 2 and 3 of the drawings, which show a non-linear (sinusoidal) pixel position or galvanometer scan location verses time (or clock pulse) diagram, for successive traces and for a portion of an individual trace, respectively.

Curve 61 represents the sinusoidal input to galvanometer scanning mirror 23 which, in effect, represents the variation in the rate of travel of beam 21 as it is scanned across recording medium 27. Each of points 65 on successive sinusoidal waveforms represents the start of a respective pixel scan from one side of the recording medium 27, whereas point 66 represents the termination of that scan at the other side or edge of recording medium 27. The interval between the previous termination point 66 and the next start point 65 corresponds to the retrace interval of recording beam 21 as it is returned from one side of the recording medium 27 back to the other to begin a new trace. Point 67 identifies a zero-crossing location that is identified by zero crossing detector 32 in accordance with sinusoidal output of scan pickup 31, which produces an output signal in corresponding to curve 61, shown in FIGS. 2 and 3, representative of the non-linear (e.g. sinusoidal) movement of scanning mirror 23. Upon detecting the zero crossing location 67, detector 32 supplies an output signal to monostable multivibrator 33 which, in turn, generates a pulse having a duration corresponding to a prescribed delay period identified by retrace time interval 64 in FIG. 2. This delay period that is set in one-shot 33 is calculated according to the time at which zero-crossing detector 32 will produce an output pulse and the time at which the start of a new scan on recording medium 27 is to begin.

A group 62 of points illustrated in FIG. 2 identifies equally spaced pixel positions that are recorded on the recording medium 27 in accordance with the novel linearizing scheme of the present invention. The manner in which these locations are linearized may be more readily understood from FIG. 3 which shows a portion of the curve 61 with successively addressed memory values 71-75 being individually identified.

As can be seen from FIG. 3, in order to linearize or make even the spacing between successive pixel positions 81-82 on the recording medium, it is necessary to compensate for the non-linearity produced by the sinusoidal shape of the rate of movement of beam 21 across recording medium 27 and the lens distortion of flat field lens 26. In accordance with the present invention, this is accomplished by successively reading out pixel location codes stored in PROM 47, selected individual ones of which 71-75 are shown in FIG. 3.

More particularly, when the system shown in FIG. 1 is enabled, high speed clock 37 generates a high speed clock signal, the pulses of which occur at a rate considerably higher than the rate of scan of recording medium and higher than the rate of pixel generation during a scan of the recording medium. Assuming that both counters 35 and 36 have been cleared by the output of one-shot 33, then at point 65, shown in FIGS. 2 and 3 counter 35 begins to count the pulses produced by clock 37. Upon the clearing of the contents of counter 36, an initial code is coupled over link 46 to memory 47. This initial address code identifies a count value to be reached by counter 35 when the first pixel is to be generated. This may correspond to the location identified by point 65 in the scan curve 61 shown in FIGS. 2 and 3. Comparator 43 compares the value output by PROM 47 and the count value produced by counter 35 as counter 35 counts clock pulses from high speed clock 37. Whenever the two values match, the voltage level on line 44 changes state, so that flip-flop 42, clocked by the high speed clock pulse on line 41, produces a signal over line 45 to increment binary counter 36 and to trigger one-shot 51.

As mentioned previously, one shot 51 produces a pixel width pulse, defining the size of the pixel spot to be formed on the recording medium 27, by the duration of the pulse produced thereby. The value of the pixel at that point as derived from data base 53 is coupled through flip-flop 55 and AND gate 54 to modulate the beam from laser 11 and record either a "1" or "0" at that location on recording medium 27 (according to the value of the data bit from data base 53), where beam 21 is currently being deflected by scanning mirror 23. For the exemplary illustration shown in FIG. 3, for initial scanning point 65, this will correspond to the value within binary counter 35 identified by point 71 corresponding to pixel location 81. Once that pixel 81 has been recorded, and binary counter 36 incremented to a new value, PROM 47 immediately outputs a new code corresponding to a prescribed count of pulses from clock 37 which will identify the location 72 shown in FIG. 3 which corresponds to the intended position of pixel 82 on recording medium 27. Counter 35 continues to count pulses and when the new value corresponding to the location 72 is reached, comparator 43 produces an output and the above-scenario is repeated. This operation continues as the recording beam 21 is scanned across medium 27.

As noted above, because of the use of the flat field lens of the type described in the above-referenced U.S. Pat. No. 4,099,829 and the generation of the narrow window pulse by one shot 51, each pixel spot that is recorded on recording medium 27 is of uniform size, and is of uniform intensity according to its binary value. Thus, even though the velocity and angle of the scanning beam are changing across the image plane of recording medium 27, the pixel pulses that are employed to record successive pixels on the recording medium are controlled to maintain a constant energy output across the field. Moreover, since the compensating code values stored in PROM 47 are derived to complement both the nonlinear scan of galvanometer 23 and the lens distortion introduced by flat field lens 26, the spacing between pixel spots is made uniform across the recording medium.

As will be appreciated from the foregoing description of the new and improved galvanometer scanning system having precision non-linearity compensation according to the present invention, uniform picture element density and exposure across each scan line is attainable. A significant aspect of the invention is its lack of complexity, as contrasted to prior art polygon scanning systems, and the multiple clock approximation approach described by Broyles et al, described above. Through a combination of a single high speed clock, compensation data memory and focus and field correcting flat field lens, an extremely precise, compensating and linearizing scanning system is affordable.

Moreover, as noted previously, the present invention is not limited to the use of a sinusoidal drive, but may be associated with any type of period drive signal, such as sawtooth, trapezodial signal, non-linear nonsinusoidal, etc. All that need be given are the characteristics of the non-linear periodic drive signal and the parameters of the flat field lens, which are easily measured, from which linearizing pixel position data is derived. This data is then stored in PROM 47 and the system is ready to operate for that particular non-linear drive. This means that the hardware structure of which the present invention is comprised is adaptable to substantially any type of periodic scanning system, the only software modification being a generation of the appropriate compensation values to be loaded into PROM for use with the particular drive of interest. Once the drive signal is established, the PROM codes are easily determinable and the system is ready for use.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. An apparatus for recording data onto a recording medium comprising:
    first means for periodically scanning an energy beam across said recording medium, which energy beam is to be modulated for recording pixels on said recording medium, and including means, disposed in the path of said energy beam, for causing each of the pixels to be recorded on said recording medium to be of uniform exposure irrespective of the angle at which said energy beam is scanned across said recording medium;
    second means for storing pixel location data representative of the desired locations of recorded pixels on said recording medium in accordance with the manner in which said energy beam is scanned by said first means; and
    third means for reading out the pixel location data stored in said second means and modulating said energy beam in response thereto so as to cause successive pixels to be recorded at prescribed locations on said recording medium as governed by said sotred data; and wherein
    said second means comprises an addressable memory in successive memory locations of which there are stored pixel location data representative of said desired locations of recorded pixels on said recording medium that compensate at least for imaging offset of said pixels on said recording medium introduced into said beam by the uniform exposure action of said causing means.

2. An apparatus according to claim 1, wherein said first means comprises a galvanometer type scanning device for periodically scanning said energy beam back and fourth across said recording medium in accordance with a prescribed non-linear periodic scanning signal, so that the velocity of travel said energy beam across said recording medium varies non-linearly.

3. An apparatus according to claim 2, wherein said second means comprises an addressable memory in successive memory locations of which there are stored pixel location data representative of said desired locations of recorded pixels on said recording medium that compensate at least for the non-linear velocity of travel of said energy beam across said recording medium.

4. An apparatus according to claim 3, wherein said third means comprises:
    a source of clock pulses;
    a first counter for counting said clock pulses; and
    a comparator coupled to said addressable memory and to said first counter, for comparing the successively read out contents of said memory with the count value of said first counter.

5. An apparatus according to claim 4, wherein said third means further comprises:
    means, coupled to the output of said comparator, for generating control pulses in response to said comparator detecting coincidence between the value of the count of said first counter and the contents of addressed memory locations in said memory; and
    means, coupled to said energy beam and responsive to said control pulses, for causing said energy beam to be modulated in accordance with information signals applied thereto.

6. An apparatus according to claim 5, wherein said third means further comprises:
    a second counter for counting said control pulses, the contents of said second counter being coupled to said addressable memory for accessing the memory locations thereof.

7. An apparatus according to claim 5, wherein said modulation causing means comprises an acousto-optic modulator, disposed in the path of said energy beam, for modulating said beam in accordance with said information signals.

8. An apparatus according to claim 7, wherein said galvanometer type scanning device is disposed downbeam of said acousto-optic modulator.

9. An apparatus according to claim 5, wherein said information signals are digital information signals.

10. An apparatus according to claim 1, wherein said energy beam is a light beam.

11. An apparatus for opticallly recording digital data on a light responsive recording medium by scanning said recording medium at a non-linear velocity with an optical energy beam modulated with said digital data comprising:
    a galvanometer type scanning device for scanning an optical energy beam back and forth across said recording medium at a scanning velocity which varies in a periodic non-linear manner;
    first means for controllably modulating said optical energy beam with said digital data so that said data is recorded on said recording medium during the scanning of said optical energy beam by said galvanometer type scanning device;
    second means for storing pixel location data representative of desired locations of recorded data on said recording medium that are equally spaced apart from one another so as to compensate for the non-linear velocity of the scanning of said optical energy beam across said recording medium; and third means for successively reading out the pixel location data stored in said second means and causing said first means to modulate said optical energy beam in response thereto as to cause successive pixels to be recorded at the prescribed locations on said recording medium as governed by said stored pixel location data compensating for the non-linear velocity of scan of said modulated optical energy beam.

12. An apparatus according to claim 11, wherein said galvanometer type scanning device comprises a galvanometer scanner which scans an optical energy beam across said recording medium at a scanning velocity which varies in a sinusoidal manner.

13. An apparatus according to claim 11, further comprising fourth means, disposed in the path of said optical energy beam scanned by said galvanometer type scanning device, for causing each of the pixels recorded on said recording medium to be of uniform exposure irrespective of the angle at which galvanometer type scanning device directs said optical energy beam toward said recording medium.

14. An apparatus according to claim 13, wherein said second means comprises an addressable memory in successive memory locations of which there are stored pixel location data representative of said desired locations of recorded pixels on said recording medium that compensate for the non-linear velocity of travel of said energy beam across said recording medium and for imaging offset of said pixels on said recording medium introduced into said beam by the uniform exposure action of said fourth means.

15. An apparatus according to claim 14, wherein said third means comprises:
 a source of clock pulses;
 a first counter for counting said clock pulses; and
 a comparator coupled to said addressable memory and to said first counter, for comparing the successively read out contents of said memory with the count value of said first counter.

16. An apparatus according to claim 15, wherein said third means further comprises:
 means, coupled to the output of said comparator, for generating control pulses in response to said comparator detecting coincidence between the value of the count of said first counter and the contents of addressed memory locations in said memory; and wherein
 said first means comprises means for modulating said optical energy beam with said digital data in response to said control pulses.

17. An apparatus according to claim 16, wherein said third means further comprises:
 a second counter for counting said control pulses, the contents of said second counter being coupled to said addressable memory for accessing the memory locations thereof.

18. An apparatus according to claim 17, wherein the duration of said control pulses defines the width of a pixel recorded on said recording medium.

* * * * *